United States Patent [19]

Hall et al.

[11] 4,116,580

[45] Sep. 26, 1978

[54] ALL CUTTING EDGE DRILL

[75] Inventors: Roy F. Hall, Overland; Elmer C. Kramer, St. Louis County, both of Mo.

[73] Assignee: McDonnell Douglas Corporation, St. Louis, Mo.

[21] Appl. No.: 786,024

[22] Filed: Apr. 8, 1977

[51] Int. Cl.² .................. B23B 51/00; B26D 1/12
[52] U.S. Cl. .................................. 408/230; 407/54
[58] Field of Search ............ 408/199, 210, 219, 220, 408/221, 222, 223, 224, 225, 226, 227, 228, 229, 230; 407/54

[56] References Cited

U.S. PATENT DOCUMENTS

| 546,041 | 9/1895 | Tybers | 408/230 |
|---|---|---|---|
| 1,069,930 | 8/1913 | Down | 408/223 |
| 2,587,980 | 3/1952 | Doepker | 408/228 |
| 2,778,252 | 1/1957 | Oxford, Jr. | 408/230 |
| 2,936,658 | 5/1960 | Riley | 408/230 |
| 3,003,224 | 10/1961 | Ribich | 407/54 |
| 3,387,511 | 6/1968 | Ackart, Sr. et al. | 408/230 |
| 3,409,965 | 11/1968 | Fisher | 408/227 |
| 3,548,476 | 12/1970 | Cave et al. | 407/54 |
| 3,564,947 | 2/1971 | Maier | 408/230 |
| 3,592,555 | 7/1971 | Mackey, Sr. | 408/225 |
| 3,779,664 | 12/1973 | Caley et al. | 408/225 |

*Primary Examiner*—Harrison L. Hinson
*Attorney, Agent, or Firm*—Gravely, Lieder & Woodruff

[57] ABSTRACT

An all cutting edge drill in which the cutting edges include the cutting edges across the point, at the shoulders between the point cutting edges and the side flute edges, and along the flute edges, all of which avoids local wear areas and gains higher surface speed and a better finish and hole size control. The drill having the all cutting edge configuration will penetrate material faster than conventional drills, can drill material too hard for conventional drills, and can be used with materials that are usually abrasive on conventional drills.

1 Claim, 8 Drawing Figures

ALL CUTTING EDGE DRILL

BACKGROUND OF THE INVENTION

Conventional fluted twist drills have the problem of excessive wear at the diametrical corners formed between the land clearance surface or margins on the flutes and the drill point cutting edges. Once wear begins at these corners it propagates rapidly and results in a drill that is rendered unusuable. Furthermore, conventional fluted twist drills produce the cutting action only at the drill point cutting edges and at the chisel edge. It is known that conventional twist drills are end-cutting tools in which the flutes are employed for the admission of cutting fluid and coolant and for the ejection of the chips. Normally, conventional twist drills divide into heavy duty and high helix or fast spiral drills. Heavy duty drills have great strength in the web and possess great rigidity which is suitable for severe drilling conditions in tough alloy steel, steel forgings and hard cast ferrous materials. The high-helix drills have a higher helix angle and are intended for deep holes where clearing chips from the hole is important.

Heat is the primary cause of drill failure. The major place for heat to be generated is at the intersection of the cutting edges and the margins. When a drill gets hot it softens the material and a plating action occurs between the material being drilled and the drill. As the plating progresses, friction increases since the margins have the highest peripheral speed and absorb heat rapidly. Heat introduces the further problem of thermal expansion of the drill diameter across the margins. Drilling a material like titanium results in the drill expanding faster than titanium which causes high side forces at the margins, and galling or plating occurs rapidly. If the drill has a heavy or thick core, chip clearance is restricted and the result is additional heat generation, higher torque and early drill failure. A drill sharpened off-center can encounter some or all of the problems noted above. After heat starts to rise in the drill point, a chain reaction occurs through expansion, increased friction, cutting edge softening, and plating, and each reaction fortifies the others.

BRIEF DESCRIPTION OF THE INVENTION

The present invention is directed to a unique improvement in twist drills in which all edges contacting the work are cutting edges.

The presently improved configuration of cutting edges may be applied to all forms and sizes of drills, reamers, and the like, and render the resulting improved drills able to handle harder and more abrasive materials than conventional drills.

The objects of the invention are to provide a drill with all cutting edges, to overcome the problems which arise when drills are sharpened with one cutting edge off center which results in rapid dulling, to incorporate cutting edges on the drill point and corner radius in combination with a split point, and to render a drill capable of longer useful life while producing close tolerance holes at a faster than normal feed rate.

Other objects of the present invention are to eliminate or reduce heat concentration at the cutting edges, corners and end intersection, to allow a more uniform heat distribution and flow into the drill body, to balance the cutting forces on the edges to reduce torque loads, to distribute wear uniformly on cutting edges, to combine drilling and hole reaming for obtaining close tolerance control of the hole, and to avoid predrilling for starting the drill of this invention.

BRIEF DESCRIPTION OF THE DRAWINGS

A preferred embodiment of the present invention is disclosed in the accompanying drawings in comparison with a standard twist drill configuration, wherein.

DETAILED DESCRIPTION OF THE DRAWINGS

Figure 1:
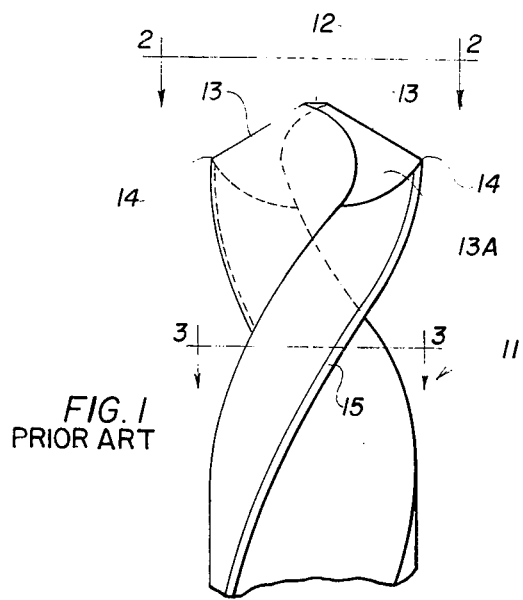
FIG. 1 is a fragmentary side view of a standard twist drill to illustrate the configuration of the drill point.
Figure 2:
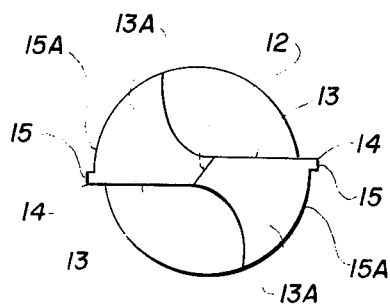
FIG. 2 is an end view taken along line 2—2 in FIG. 1.
Figure 3:
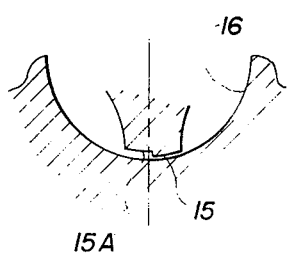
FIG. 3 is an enlarged and fragmentary section view of a typical drill margin.

The configuration of the improved all cutting edge drill 10 is best understood by comparing it with a typical twist drill 11 of prior art configuration. With reference to FIGS. 1 and 2, it is readily seen that the point 12 of drill 11 is a chisel located in dead center of the longitudinal axis and having a length which represents the thickness of the core. Cutting edges 13 extend outwardly in radial directions from the opposite ends of the chisel point 12 and terminate at sharp corners 14 in the margins 15. The margins 15, as seen in FIG. 3 in working relation to the side wall or surface 16 of a drilled hole, are drill body extensions concentric with the drill axis. The diameter of the drill 11 is measured across the margins 15, as these margin surfaces ride on the hole side wall 16 and merely guide the drill.

When viewing FIGS. 1 and 2, it is evident that the cutting edges 13 lie on the surface of the cone point, but the surfaces 13A behind the cutting edges do not lie in the cone but are "backed off" to provide a relief so the cutting edges preceed the surfaces to advance the drill. In like manner, the side surfaces 15A behind the margins 15 are recessed to provide body clearance in the drilled hole. There is no cutting action developed by the corner 14 where the cutting edges 13 meet the side margins 15, and no cutting action can take place along the length of the drill as margins 15 are concentric with the drill axis.

Figure 4:
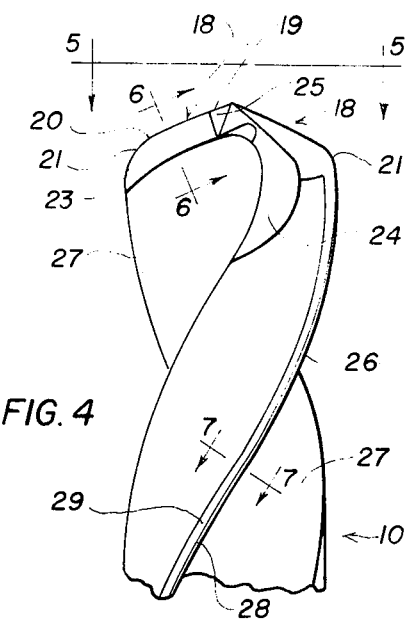
FIG. 4 is a fragmentary side view of the drill representative of this invention to show certain important features of the point geometry.
Figure 5:
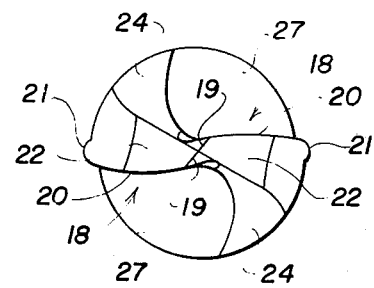
FIG. 5 is an end view along line 5—5 in FIG. 4.
Figure 6:
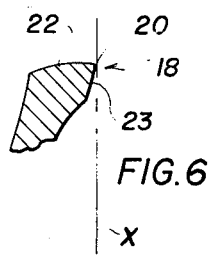
FIG. 6 is a fragmentary section view of one point cutting edge as seen at line 6—6 in FIG. 4.

Turning now to FIGS. 4 to 7, which depicts the drill of this invention, the differences over the typical drill of FIGS. 1 to 3 are evident. The improved drill 10 is formed with a split point in which the cutting edges 18 on the cone point may be formed as a continuous curve or by two or more angles. As shown, the cutting edges have a short split point edge 19 extending across the axis of the drill body 10 and joined by the edges 200 which extend generally radially to outer curved end portions 21. The cutting edges 19 and 20 are backed up by end surfaces 22 which are backed off the cone so as not to present a surface in rubbing contact with the hole being drilled. As can be seen in FIG. 6, the cutting edge 20 is backed by the surface 22, and the edge itself is formed by grinding the face 23 to form the axial relief angle to the longitudinal axis X of the drill. The axial relief angle can vary from 6° to 10°. When grinding the cutting edges the grinding wheel will pass across the drill and form the clearance surfaces 24 and also form the axial relief surface 25 for the cutting edge 19. This grinding step preceeds the grinding step to form the lip relief face 23.

Figure 7:
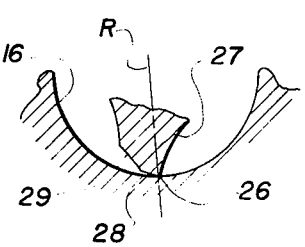
FIG. 7 is an enlarged and fragmentary section view of a typical side cutting edge as seen at line 7—7 in FIG. 4.

The view of FIG. 7 shows another feature of the improved drill. Here the usual concentric margin of a typical drill, such as that seen in FIG. 3, is changed to form a cutting edge 26 which extends along the margin of each flute 27. The edge 26 has a radial relief surface 28 formed at an angle of from 5° to 10°, and a clearance surface 29 directed at an angle of from 10° to 20°. These angles are measured in relation to the radius R of the drill through point 26.

It can be seen in the prior art example of FIG. 3 that the margin surface 15 is a non-cutting surface and merely provides support in the side wall of the hole 16 being drilled. The drill point is formed with radial end cutting edges 13, as extension of the flute surfaces, and with relief surfaces 13A for the end cutting edges. In a conventional drill of the type seen in FIG. 1, the increase in temperature during drilling resulted in thermal expansion of the drill diameter so that the dimension across the corner points 14 enlarges causing the hole being drilled to be slightly larger than the body of the drill. This condition is attributed to the scoring or rubbing of the corners 14 of the cutting edges 13 on the material.

By comparison of FIGS. 4 and 5 with the prior art view of FIGS. 1 and 2, it can be seen that the improved drill is formed with effective cutting edges from the split point edges 19 through the end cutting edges 20 and the radial cutting edges 21 to the side cutting edges 26. This all cutting edge configuration allows faster cutting rates with less torque requirements, less galling on the cutting edges and a better finish in the hole side wall. It will also allow for better hole size control as the cutting edges 26 act to ream the hole 16 concurrently with drilling the hole. Also, the cutting edges 26 extend along the flutes a sufficient distance so that regrinding is eliminated.

The improved drill of FIGS. 4 to 7, overcomes the disadvantages of the prior art drills of FIGS. 1 to 3 in that the improved drill is formed with curved shoulder cutting edges 21 to control the heat flow through the cutting edges 18 and that allows uniform force to be applied to the cutting action. The radius of the curved edges 21 is about 12 percent of the diameter of the drill 10. The all cutting edges, including the split point edges 19, reduce the torque and end thrust. The standard dead end on drill produces high end thrust and burnishing action which calls for increased torque and that results in generation of excessive heat.

Figure 8:
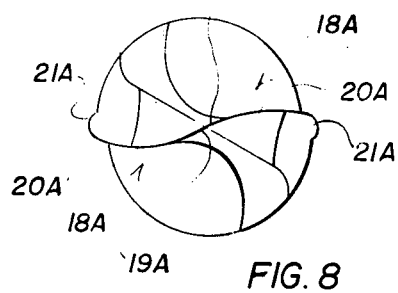
FIG. 8 is an end view similar to the end view of FIG. 5, but illustrating a modification in the geometry of the cutting edges.

The view of FIG. 8 illustrates a modification in which each of the cutting edges 18A is generated along a substantially continuous curve from the cylindrical centerline of the drill to the outer cylindrical cutting edge creating edge 21A. This cutting edge 18A is comprised of the split point 19A cutting edge 20A and axial relief 23 (see FIG. 6) as one continuous curve blending with the side cutting edge 26 at point 21A.

There has been set forth above the important characteristics of the present invention in sufficient detail to permit others to understand the characteristics thereof. The configuration of the present drill is capable of reducing cutting time significantly and at the same time lengthening the useful life of the drill between resharpening operations. The reduction in cutting time is achieved by the herein disclosed changes in the geometry of the cutting edges, and such changes have been instrumental in saving time for drilling operations by increasing the drilling speeds and feeds. Furthermore, the changes in the geometry of the cutting edges effectively eliminates high frictional loads and that advantage has contributed to the reduction in the heat build-up at the critical areas of the cutting edges. It can be appreciated by those skilled in this art that the present invention possesses the improved ability to cut clean close tolerance holes, to rapidly expel chips, and simplify the operation of regrinding cutting edges which will eventually become dull after an extended period of use.

What is claimed is:

1. In an all cutting edge drill comprising: an elongated generally cylindrical body formed with a cone shaped end and chip clearance flutes in the side of and extending spirally about the cylindrical body, said body having an axis of rotation passing through the apex of the cone shaped end; the improvement in which said cone shaped end includes at least two circumferentially spaced end surfaces and the cylindrical body is formed with side surfaces extending from said end surfaces and directed spirally along the cylindrical body in circumferentially spaced relation to form chip clearance flutes; each of said end surfaces having margins adjacent said apex forming oppositely facing cutting edges starting at said axis of rotation to form a split drill-point, second cutting edges on said end surfaces forming continuations of said split point cutting edges and directed toward the sides of said cylindrical body and third cutting edges continuing from said second cutting edges and curving into said cylindrical body side surfaces; and said side surfaces having side cutting edges which are continuations of said third cutting edges and follow said spiral flutes, said third cutting edges having a radius of curvature of about 12 percent of the diameter of the cylindrical body and blending into said second cutting edges and said side cutting edges, whereby said drill in forming a hole cuts from said axis of rotation at said apex to and including the cylindrical sides of said body.

* * * * *

UNITED STATES PATENT OFFICE
CERTIFICATE OF CORRECTION

Patent No. 4,116,580　　　　　　　　Dated September 26, 1978

Inventor(s) Elmer C. Kramer and Roy F. Hall

It is certified that error appears in the above-identified patent and that said Letters Patent are hereby corrected as shown below:

On the title page, item [75] should read as follows:

-- Roy F. Hall, Overland; Elmer C. Kramer, Catawissa, County of Jefferson, both of Mo. --

Column 2, line 63, "200" should read -- 20 --.

Signed and Sealed this

Twenty-seventh Day of March 1979

[SEAL]

Attest:

RUTH C. MASON
Attesting Officer

DONALD W. BANNER
Commissioner of Patents and Trademarks